Oct. 26, 1971 G. P. RABEY 3,614,950
APPARATUS FOR LOCATION RELATIVELY TO A SUBJECT'S CEPHALIC AXIS
Filed March 17, 1969 2 Sheets-Sheet 1

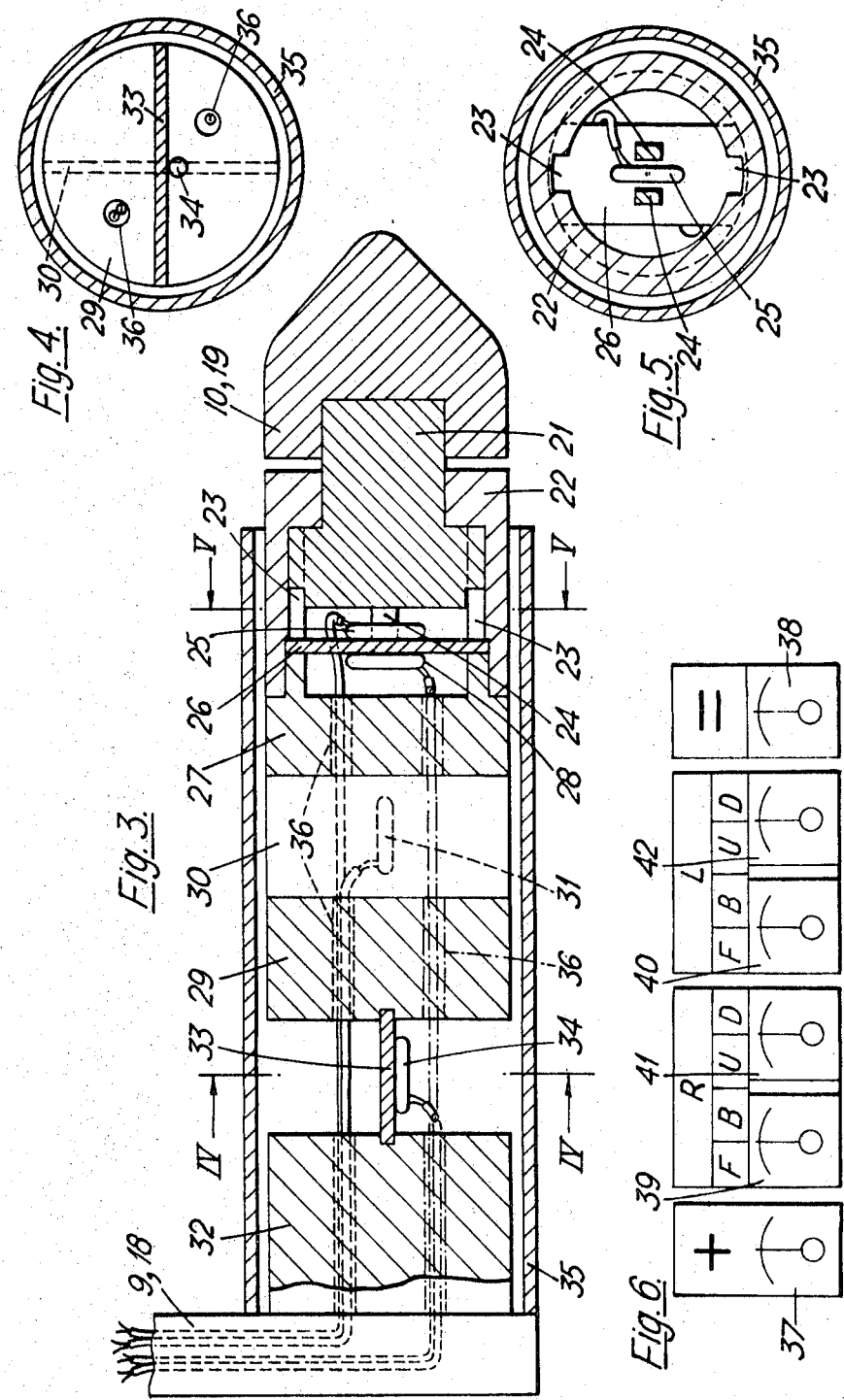

United States Patent Office 3,614,950
Patented Oct. 26, 1971

1

3,614,950
APPARATUS FOR LOCATION RELATIVELY TO A SUBJECT'S CEPHALIC AXIS
Graham Peter Rabey, "Greenbanks," Trout Rise,
Loudwater, Hertfordshire, England
Filed Mar. 17, 1969, Ser. No. 807,583
Claims priority, application Great Britain, Mar. 25, 1968,
14,239/68
Int. Cl. A61b *5/10;* A61c *19/04*
U.S. Cl. 128—2 R
6 Claims

ABSTRACT OF THE DISCLOSURE

A head clamp or face bow, having a pair of coaxial ear plugs which are arranged to be inserted into a subject's outer ears to locate the subject's cephalic axis relatively to the apparatus. The ear plugs are movable towards and away from one another to accommodate heads of different size whilst maintaining the plugs equidistant from a central reference in the apparatus. A sensing device is interposed between each ear plug and a part of the apparatus which is required to be located in use relatively to the subject's cephalic axis, the sensing devices responding in use to the reaction between the subject's outer ears and the corresponding ear plugs and means are provided whereby the responses of the two sensing devices may be compared so that the subject's head may be adjusted until the reaction between the subject's outer ears and the two ear plugs are equal.

---

Figure 1:
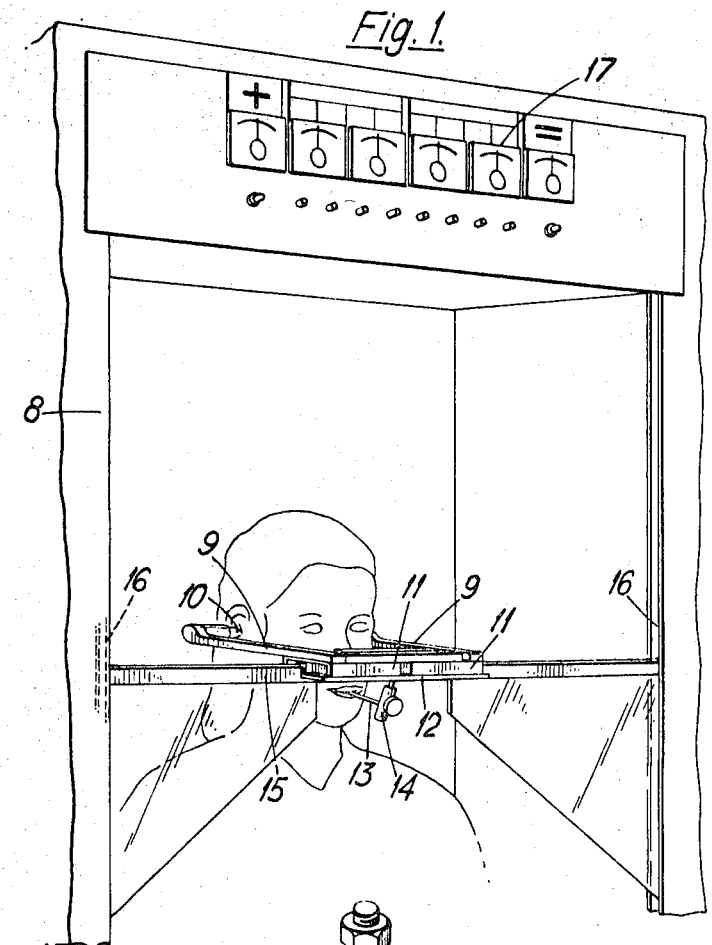

This invention is concerned with apparatus of the kind having a pair of coaxial ear plugs which are arranged to be inserted into a subject's outer ears to locate the subject's cephalic axis relatively to the apparatus. The ear plugs are movable towards and away from one another to accommodate heads of different size whilst maintaining the plugs equidistant from a central reference in the apparatus. Examples of such apparatus are the head clamp and the face bow described in my application No. 638,011, now U.S. Pat. No. 3,514,606.

Previously a practitioner using the head clamp or face bow has had to rely upon the subject's sense of feel to tell him when the ear plugs are located to an equal extent in the subject's two outer ears. This is unsatisfactory and indeed even if the subject has indicated correctly when the plugs are equally inserted into his outer ears, the outer ears are lined with skin which allows the subject to move, tilt and turn his head to a slight extent relatively to the apparatus, thus preventing an accurate and continuous location of the head relatively to the reference.

In accordance with the present invention, in apparatus of the kind described, a sensing device is interposed between each ear plug and a part of the apparatus which is required to be located in use relatively to the subject's cephalic axis, the sensing devices responding in use to the reaction between the subject's outer ears and the corresponding ear plugs and means being provided whereby the responses of the two sensing devices may be compared so that the subject's head may be adjusted until the reaction between the subject's outer ears and the two ear plugs are equal.

Each sensing device preferably incorporates at least one strain gauge for measuring a reaction on the corresponding ear plug, one suitable form of strain gauge consisting of a resilient diaphragm or web carrying a piezo-electric element, such as a silicon crystal, flexing of the diaphragm stressing the element and producing an electrical voltage which is fed to the comparison means. This electrical signal response of the strain gauge may be compared electrically and automatically with the corresponding signal from the corresponding strain gauge in the sensing device for the other ear plug and causing a visual or audible warning, such as a light, to be energised when the reactions being sensed are the same, and/or null, and/or a pre-set value. Alternatively the response of each strain gauge may be used to activate a visual meter, such as a needle moving over a scale, so that equal reactions on the two ear plugs are recognised when the two meters give equivalent readings.

There are preferably three strain gauges in each sensing device, one strain gauge being responsive to a cephalic axial reaction between the outer ear and the ear plug, and the other two being responsive to mutually perpendicular reactions perpendicular to the cephalic axis. When the subject's head is properly centered in the apparatus, the horizontal and vertical reactions will be null, but a minimum but equal reaction is desirable in the axial direction.

For this purpose each of the strain gauges responsive to reactions perpendicular to the cephalic axis is preferably connected to a visual meter which indiactes a reaction sensed by that strain gauge and the sense of the reaction on either side of the null position. The strain gauges associated with the two ear plugs and responsive to cephalic axial reactions are then connected to two visual meters one of which indicates when either of those two strain gauges senses a positive cephalic axial reaction and the other meter indicates when the axial reactions sensed by these two strain gauges are equal, and when they are not equal, which is sensing the greater reaction.

Each ear plug may be provided with two strain gauges sensing an axial reaction, instead of one. This simplifies the electronic circuitry associated with two visual meters indicating the axial reaction conditions since one of the strain gauges associated with each ear plug can be connected to one of the meters and the other strain gauge to the other of the meters.

Figure 2:
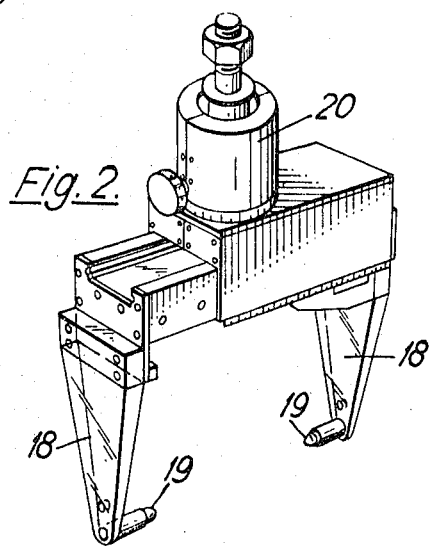

Examples of a face bow and head clamp constructed in accordance with the invention are illustrated in the accompaying drawings in which:

FIG. 1 is a perspective view of the face bow;
FIG. 2 is a perspective view of the head clamp;
FIG. 3 is a vertical axial section through an ear plug assembly of either the face bow or head clamp;
FIG. 4 is a section taken on the line IV—IV in FIG. 3;
FIG. 5 is a section taken on the line V—V in FIG. 3; and,
FIG. 6 is a diagrammatic view of meters used with either the face bow or head clamp.

The face bow illustrated in FIG. 1 is substantially identical to that illustrated in FIG. 6 of my earlier application Ser. No. 638,011, now U.S. Pat. No. 3,514,606, except for the new ear plug assembly and for the mounting of the face bow in a frame 8. As best seen in FIG. 7 of said prior application the face bow consists of a pair of side pieces 9 carrying at their free ends inwardly projecting ear plugs 10 and being in turn carried from supports 11 which are slidable linearly to and fro relatively to a base plate 12 so that the ear plugs 10 are always equidistant from a centre point which is fixed within a reference frame. A bite fork 13 is attached to the base plate 12 through a universal joint 14 which can be tightened.

The base plate 12 is detachably fixed to a cross head 15 the ends of which are guided upwards and downwards on vertical rails 16 in the frame 8 so that the face bow can be raised and lowered. This movement does not however affect the orientation of the face bow the side pieces 9 of which always remain horizontal.

In use the height of the face bow is adjusted and fixed such that the plane defined by the upper edges of the side pieces 9 are in alignment with one of the subject's orbitale points. The side pieces are then moved towards one another so that the ear plugs 10 enter the subject's outer ears whilst the bite fork 13, which has been given a wax covering, is gripped between the occluded teeth. When the subject's outer ears are centralized relatively to the ear plugs, as indicated by meters 17 to be described later, the universal joint 14 is tightened up so that a recording exists of the relationship between the subject's maxilla and the reference frame.

The face bow is then removed and used to prepare mouth models for photographing as described in detail in my earlier application.

The head clamp illustrated in FIG. 2 is identical, except for the ear plug assemblies, to that described with reference to FIG. 3 of my earlier application. Thus it has side pieces 18 carrying ear plugs 19, the side pieces 18 being movable towards and away from one another but being maintained equidistant to the vertical axis of a turntable 20 which enables the head clamp to be rotated relatively to the photographic unit described in my earlier application.

FIG. 3 shows the manner in which the conical ear plugs 10 or 19 are supported from the side pieces 9 or 18. The ear plug 10 or 10, is cemented to a plunger 21 which is slidable axially in a housing block 22 and is prevented from rotating by means of axial keyways 23. At its inner end the plunger 21 has two projecting portions 24 which straddle a piezoelectric crystal strain gauge 25 and bear against a resilient metal diaphragm 26 trapped between a shoulder on the housing block 22 and an end of a block 27 to which the housing block is cemented. A second similar strain gauge 28 is mounted on the other side of the diaphragm 26. The block 27 is connected to another block 29 by means of a vertical resilient metal diaphragm 30 carrying another similar strain gauge 31 and the block 29 is connected to a block 32 by means of a horizontal resilient metal diaphragm 33 carrying another similar strain gauge 34. The block 32 is rigidly fixed to the free end of the side piece 9 or 18 from which the ear plug 10 or 19 is thus supported in cantilever fashion. The assembly is surrounded freely by a tubular guard 35 fixed at one end at the side piece 9 or 18. Electric lead wires extend from these strain gauges, where necessary through passageways 36 through the blocks 27, 29 and 32 and through the side piece 9 or 18 to the meters which are shown particularly in FIG. 6.

The strain gauges 25 and 28 both respond to an axial reaction between the subject's ears and the ear plug 10 or 19, the reaction causing the plunger 21 to slide in the housing 22 and deflect the diaphragm 26 inwards. The two strain gauges 25 of the two ear plug assemblies are connected to a meter 37 which gives a positive reading when at least one of the gauges 25 indicates that its ear plug is receiving an axial reaction. The strain gauges 28 are connected to a meter 38 which compares the two responses and indicates by means of a needle moving to one side or other of a null position, which of the two ear plugs is receiving the greater axial reaction. When the subject is centralized relatively to the apparatus, the meter 37 will give a positive reading and the meter 38 a null reading. A null reading on the meter 38 would be unsatisfactory by itself as this would be produced if the subject was producing no reaction at all on the two ear plugs. Alternatively the strain gauges 25 and 28 of each ear plug assembly may be replaced by a single gauge connected to both the meters 37 and 38. The disadvantage of this is that the electrical circuiting has to be more complex.

Each strain gauge 31 responds to deflection of its diaphragm 30 out of the plane of the drawing in FIG. 3, that is as a result of a horizontal reaction between the subject's outer ears and the corresponding ear plug. The strain gauge 31 of the right ear plug is connected to a meter 39 and that of the left ear plug to a meter 40. Each of the meters 39 and 40 has a needle which indicates a null reaction or a reaction in either sense on each side of a null position. Similarly each strain gauge 34 is responsive to a vertical reaction between the subject's outer ear and the corresponding ear plugs and these strain gauges are coupled to a meter 41 for the right ear and a meter 42 for the left ear respectively. The meters 41 and 42 are similar to the meters 39 and 40. The calibration of the meters 39, 40, 41 and 42 is such that a practitioner can immediately see what reaction perpendicular to the cephalic axis the apparatus is receiving from the subject's outer ears and can instruct the subject to for example raise his right ear and bring his left ear forwards until a null reading exists on all four of the meters. Provided the previously mentioned conditions relevant to the meters 37 and 38 are met, the subject will then be located centrally relatively to the reference cephalic axis defined by the ear plugs.

I claim:

1. Apparatus comprising a pair of coaxial ear plugs adapted to be inserted into a subject's outer ears to locate the subject's cephalic axis, a reference member defining a central reference point midway between said ear plugs, means slidably mounting said ear plugs relatively to said reference member whereby said ear plugs may be moved linearly towards and away from one another to accommodate heads of different size but are maintained equidistant from said central reference point, a pressure responsive sensing device interposed between each ear plug and said reference member, said sensing devices being adapted to produce a signal representative of the reaction between said outer ears and said ear plugs, and means for comparing the signals at said two sensing devices so that said subject's head may be adjusted until said reaction between said outer ears and said two ear plugs are equal.

2. Apparatus according to claim 1, wherein each sensing device incorporates at least one strain gauge.

3. Apparatus according to claim 2, wherein each strain gauge comprises a piezoelectric element carried by a resilient diaphragm adapted to be flexed by a reaction between the corresponding one of said outer ears and said ear plug, flexing of said diaphragm stressing said element and producing an electrical voltage and means feeding said electrical voltage to said comparison means.

4. Apparatus according to claim 2, wherein there are three strain gauges in each sensing device, one strain gauge being responsive to a cephalic axial reaction between said outer ear and said ear plug, and the other two of said three strain gauges being responsive to mutually perpendicular reactions perpendicular to said cephalic axis.

5. Apparatus according to claim 4, wherein each of said other two strain gauges is connected to a visual meter adapted to indicate a reaction sensed by the corresponding strain gauge and the sense of said reaction on either side of the null position, and said strain gauges associated with both said ear plugs and responsive to cephalic axial reactions being connected to two further visual meters one of said further visual meters indicating when either of said axial strain gauges senses a positive cephalic axial reaction and the other of said further visual meters indicating when the axial reaction sensed by said two axial strain gauges are equal or, if they are not equal, which of said ear plugs is sensing a greater axial reaction.

6. Apparatus according to claim 4, further comprising two side supports adapted to pass the sides of said subject's head, a tubular guard extending from each of said side supports towards and coaxially with the other guard, relatively movable rigid parts housed within said guard, diaphragms interconnecting adjacent pairs of said rigid parts whereby each ear plug projects clear of the free end of one of said guards.

References Cited
UNITED STATES PATENTS

| | | | |
|---|---|---|---|
| 268,614 | 12/1882 | Brown | 32—19 |
| 2,604,559 | 7/1952 | Shapiro | 32—19 X |
| 2,787,837 | 4/1957 | Gelfand | 33—174 |
| 2,814,876 | 12/1957 | Stuart | 32—19 |
| 2,918,816 | 12/1959 | Ormond | 73—88.5 X |
| 3,297,021 | 1/1967 | Davis et al. | 32—19 X |
| 3,374,548 | 3/1968 | Romney | 33—174 |
| 3,382,581 | 5/1968 | Balazes | 32—19 |
| 3,431,649 | 3/1969 | Guichet | 32—20 |

RICHARD A. GAUDET, Primary Examiner

K. L. HOWELL, Assistant Examiner

U.S. Cl. X.R.

32—20; 33—174 D; 128—303